Patented Oct. 28, 1924.

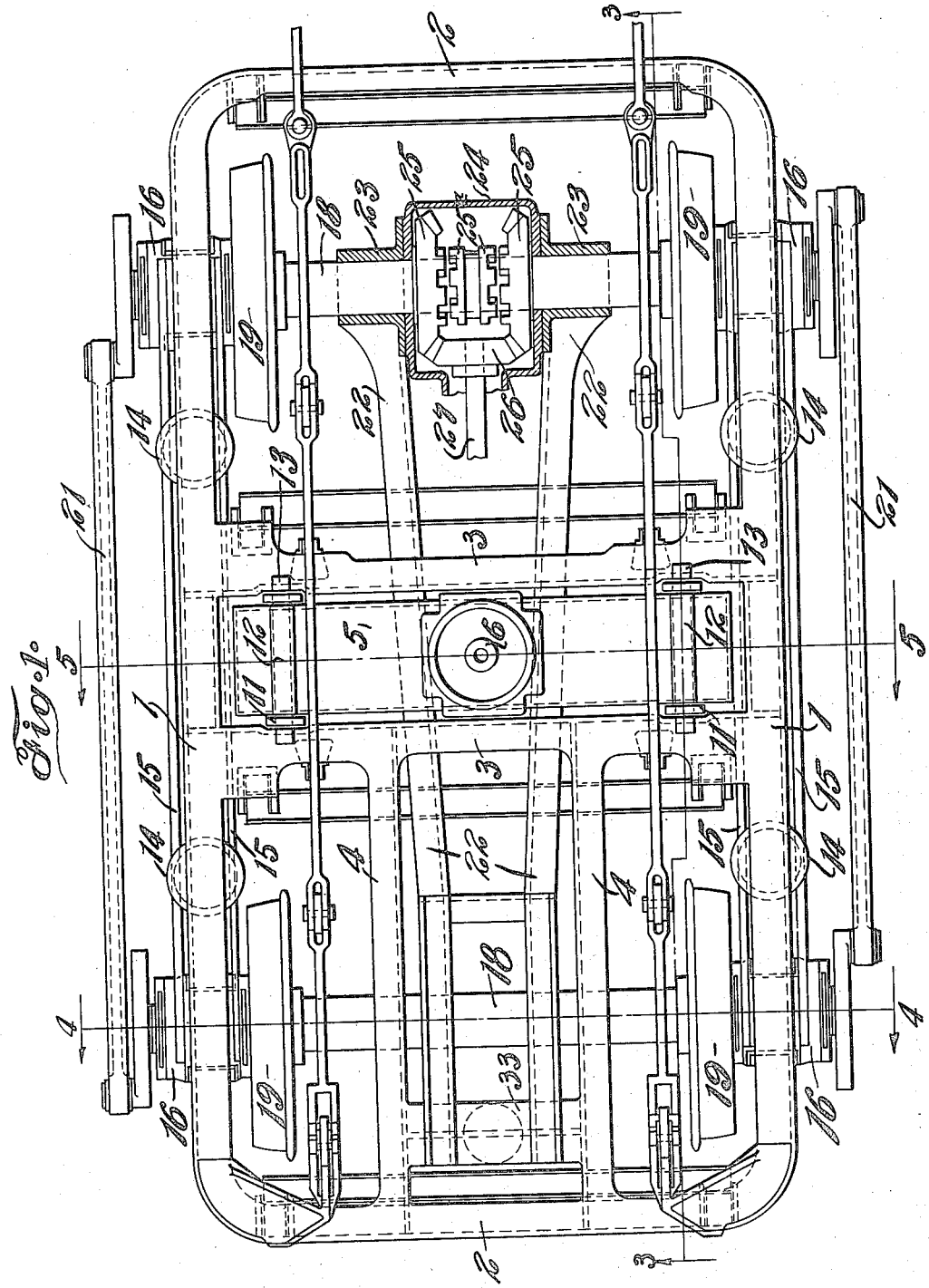

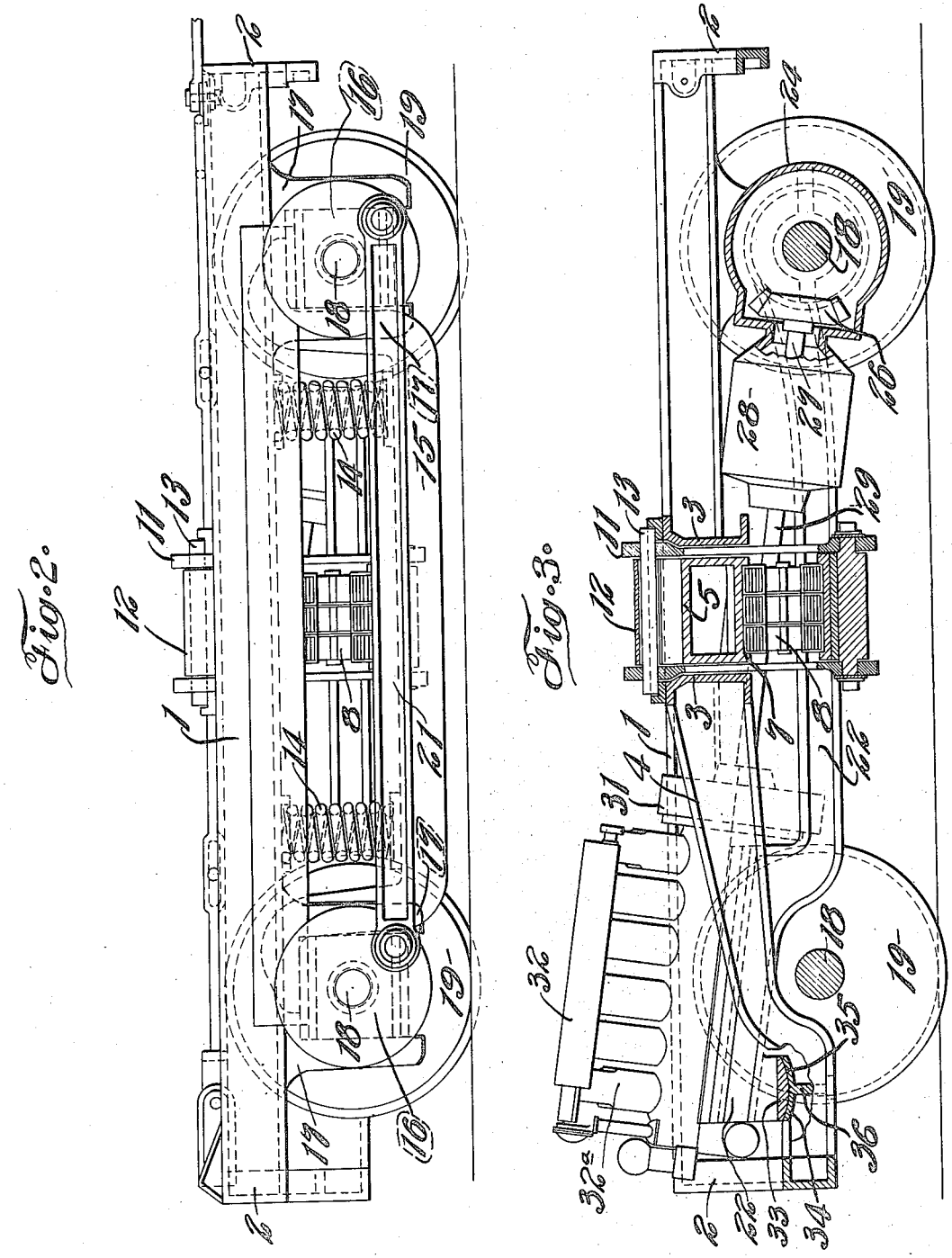

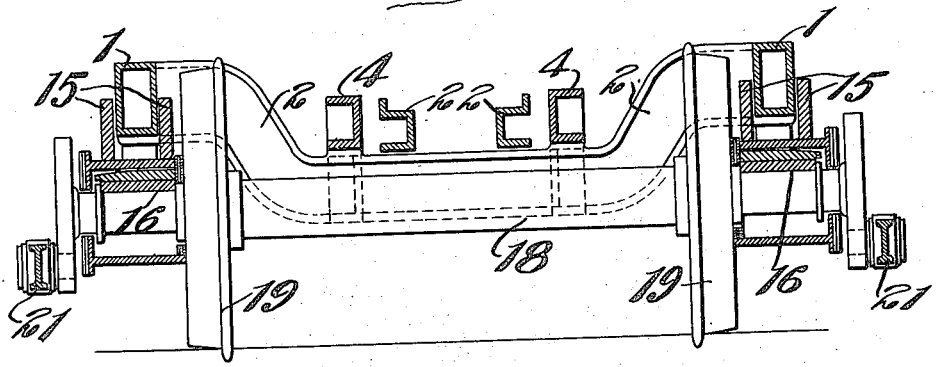
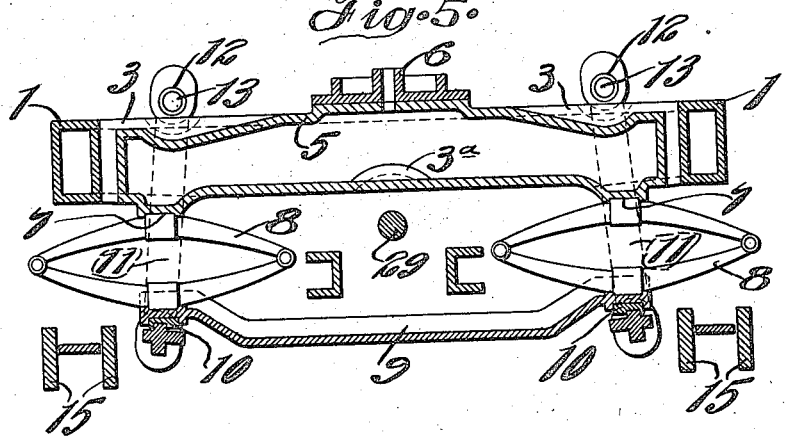

1,513,346

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

MOTOR TRUCK.

Application filed June 17, 1922. Serial No. 569,145.

*To all whom it may concern:*

Be it known that I, HARRY M. PFLAGER, a citizen of the United States, residing at the city of St. Louis and State of Missouri, have invented a certain new and useful Improvement in Motor Trucks, of which the following is a full, clear, and exact description, such as will enable others skilled in the art to which it appertains to make and use the same, reference being had to the accompanying drawings, forming part of this application, in which—

Figure 1 is a top plan view of my improved motor truck.

Figure 2 is a side elevational view of the truck.

Figure 3 is a vertical longitudinal sectional view through the truck on line 3—3 of Figure 1.

Figure 4 is a cross-sectional view through the truck on line 4—4 of Figure 1.

Figure 5 is a sectional view through the truck on line 5—5 of Figure 1.

This invention relates to a new and useful improvement in motor trucks of that type illustrated in a companion application filed by me of even date herewith, the object being to construct a motor truck frame and engine mount of cast steel, the latter having a three-point support, i. e., two bearings on the driver axle and one bearing on the truck frame so that the engine mount is free to rise and fall at its axle end and to rotate about a longitudinal center, and to accommodate itself to the movements of the driver axle.

In the particular type of truck shown, the axle bearings are located outside of the wheels, the axles extending through the journal boxes and having cranks on their outer ends connected on each side of the truck by connecting rods. The truck is equipped with a conventional type of internal combustion engine with the usual friction clutch and selective gear shift, whereby one axle is driven, and by the connecting rods the other axle is likewise driven. The type of motor employed may be of any commercial type and preferably is capable of developing from three to six hundred horsepower, depending upon the grades encountered and the load to be hauled.

In practice, there is usually a truck under each end of the car, and each of these trucks may be motor-equipped with controlling means therefor extending through the platform of the car and into a vestibule or cab located at the end or ends of the car. Each car thus becomes a self-contained motor driven unit and may be employed on side, branch and tap lines, as they are some times called, in hauling or delivering freight to the main lines. Being of standard gauge and having standard equipment, such a motor car can be coupled to a train on the main line for a long haul. The motor car, of course, will take care of the shorter hauls, and by replenishing the liquid fuel, may make hauls of greater or less distance.

I have illustrated an internal combustion engine as a form of motive power used, but it is obvious that other types of motors could be employed. Where the road is electrified, electric motors could be used.

In the drawings, the truck frame is shown as being made of a single casting, preferably steel, in which 1 indicates the side members, 2 the end members and 3 the transom members. The side members are preferably box-shaped in cross-section, as shown in Figure 4, while the end and transom members are substantially channel shaped (see Figure 3), said end and transom members being provided with perforated lugs for the attachment of the brake rigging.

4 are channel shaped longitudinally disposed members extending from one of the end members 2 to one of the transom members 3. 5 indicates the bolster having the usual center bearing 6, said bolster having spring seats 7 near each end resting upon springs 8, shown in this instance as elliptic springs. Intermediate seats 7 the bottom of the bolster is elevated or recessed for clearance purposes. Springs 8 rest upon spring plank 9, which is in turn supported by the cross member 10 of supporting links 11. These supporting links (see Figure 3) are spaced apart by a sleeve 12 at their upper ends through which passes a pin 13, the ends of said pin resting in bearings on the upper faces of transoms 3. This construction forms the subject-matter of another application filed by me Serial No. 700,323.

14 indicate frame supporting springs resting upon spaced equalizer bars 15, the ends of said bars being goose-neck in shape and supported by the journal boxes 16. These journal boxes are arranged between pedestal jaws 17 extending downwardly from the side frame members 1 and preferably the equalizer bars 15 are arranged on each side of the pedestal jaws, as shown in Figure 4.

18 indicates the wheel axles and 19 the wheels. The axle 18 extends through the journal box and is provided with a counter-weighted crank on each end, the pins of which cranks are connected together by a connecting rod 21.

22 indicates a frame member having bearings 23 at one end for receiving one of the axles 18. These bearing members are spaced apart by means of a gear casing 24, said gear casing enclosing two miter gears 25 loose on axle 18, said gears having inwardly presented clutch faces for co-operating with a shifting clutch member 25ª splined to axle 18, whereby the direction of drive of axle 18 may be reversed by shifting this clutch. I have not shown the shifting means for this clutch member.

26 indicates a pinion meshing with gears 25, said pinion being mounted on shaft 27 having a bearing in casing 28 which houses the transmission gear. 29 is the motor driven shaft for the transmission gear, which shaft is inclined and passes beneath the bolster and a recess 3ª in one of the transom members 3, whereby said shaft, bolster and transom are free to move independently of each other. Shaft 29 may carry a balance wheel 31.

32 indicates an engine casing having a battery of cylinders 32ª and its usual parts. This engine casing rests upon and is supported by the end of frame 22, and, preferably immediately over one of the axles 18. Frame 22 is provided with a cross-member 33 having a rocker bearing 34 on its lower face, which rocker bearing co-operates with a rocker seat 35 on a cross-member 36 bridging the longitudinal members 4, before mentioned.

By arranging the free end of frame 22, that is the end of frame 22 which is not mounted on the axle 18, between the members 4 of the truck frame, and arranging the motor on said frame between said truck frame members, it is obvious that said truck frame members constitute limit stops preventing accidental displacement of the parts when the truck is traveling at high speed around a curve. Furthermore, the rocking bearing readily accommodates the tilting movement of the axle on which the frame 22 is mounted, as well as permitting an independent tilting movement of the truck side frames. The axle 18 on which the frame 22 is mounted may also swing horizontally to the extent of the play allowed by its associate parts, without disturbing the alinement and proper mesh between the motor, the transmission gear, and the main driving gear for the axle.

In this form of motor truck, it will be noted that the motor casing is inclined or tilted slightly so that its shaft may pass under the transom and bolster, thus avoiding the necessity of providing enlarged openings in these parts for receiving the shaft as disclosed in the aforesaid companion application.

What I claim is:

1. A truck frame having side, end and transom members, pedestal jaws and boxes, axles mounted in said boxes, a motor supporting frame having a bearing on one axle at one end, and an inclined motor supporting surface at its opposite end, said frame extending from one axle to a point beyond the other axle and being supported by the truck frame at said last mentioned extremity.

2. In combination with a truck frame, its wheels and axles, a bolster, a motor supporting frame pivotally mounted on an axle to one side of said bolster, said motor supporting frame being supported by said truck frame on the opposite side of said bolster and being provided with an inclined motor supporting surface, whereby the motor driven shaft may pass diagonally under the bolster.

3. In combination with a truck frame, its wheels and axles, a motor supporting frame pivotally mounted on one of said axles and extending over and beyond the other axle, said last mentioned extremity being inclined, and a rocker bearing support on the truck frame for the extended end of said motor frame.

4. In combination with a truck frame, its wheels and axles, a swinging bolster, a motor supporting frame pivotally mounted on one of said axles, and extending beyond the other of said axles, a support on the truck frame for the extended end of said motor frame, a motor frame mounted on said extended end and inclined so that its driven shaft will pass under said bolster, a motor driven shaft, gear wheels on the axle upon which said motor supporting frame is mounted, and reversing mechanism co-operating with said gear wheels.

5. In a truck, wheeled axles, a frame having side pieces, transoms and ends, a portion of one of said ends being a substantial distance below said side pieces and transom, inclined longitudinal members between said lower portion of one end and the adjacent transom, and an oppositely inclined motor frame mounted on said lower end portion and on an axle at the opposite end of the truck.

6. In a truck, wheeled axles, a truck frame including sides, ends, intermediate transoms, and longitudinal members between said sides extending from one end to the adjacent transom, a motor frame between said members extending from said end to the axle at the opposite end of the truck, said members and motor frame being inclined in opposite directions.

7. In combination, a bogy truck frame, wheeled axles and an inclined motor frame mounted at one end on one of said axles and at its other end upon the upper face of an adjacent member of said truck frame.

8. In combination, a truck frame, wheeled axles, a bolster, a spring plank and an inclined motor frame extending from one of said axles between said bolster and spring plank to the opposite end of the truck where it is mounted upon the upper face of the adjacent member of said truck frame.

9. In a truck, wheeled axles, a truck frame, an inclined motor located at one end of said frame, and an inclined driving connection between said motor and the axle at the opposite end of the truck.

10. In a truck, wheeled axles, a truck frame, a bolster, an inclined motor mounted at one end on said frame, and an inclined driving connection extending beneath said bolster and between said motor and the axle at the opposite end of said frame, the bottom of said bolster being elevated to accommodate said connection.

In testimony whereof I hereunto affix my signature this 12th day of June, 1922.

H. M. PFLAGER.